United States Patent [19]
Wakai

[11] Patent Number: 6,119,431
[45] Date of Patent: Sep. 19, 2000

[54] METHOD OF MOVING HEAVY MATERIALS

[75] Inventor: Takao Wakai, Osaka, Japan

[73] Assignee: Wakai & Co., Ltd., Higashiosaka, Japan

[21] Appl. No.: 09/166,897

[22] Filed: Oct. 6, 1998

[51] Int. Cl.⁷ ........................................................ E04B 1/00
[52] U.S. Cl. ............................. 52/745.2; 52/125.4; 29/525
[58] Field of Search ................................ 52/745.2, 745.19, 52/745.1, 745.13, 745.08, 125.4, 125.3, 125.6, 125.2, 125.1; 414/10, 11; 83/862, 863, 39; 29/525

[56] References Cited

FOREIGN PATENT DOCUMENTS

| | | |
|---|---|---|
| 0 090 780 | 10/1983 | European Pat. Off. . |
| 790800 | 11/1935 | France . |
| 28 23 372 | 12/1979 | Germany . |

*Primary Examiner*—Michael Safavi
*Attorney, Agent, or Firm*—Wenderoth, Lind & Ponack, L.L.P.

[57] ABSTRACT

A method of safely hanging and moving an ALC block can be carried out at a construction site at a low cost. Holes are formed in the top surface of an ALC block. Starting holes are formed, with anchor being in the bottoms of the respective holes. Anchors are formed each made up of three metallic plates superposed one on another and having a first and a second end. The metallic plates are joined together at the first end. Each anchor has a hole at the first end. The anchors are driven into the respective starting holes and into the ALC block with the second end first while spreading apart the outer metallic plates so that the anchors will not be easily pulled out. The hanger tools are engaged in the holes formed in the anchors to hang and move the ALC block.

9 Claims, 5 Drawing Sheets

METHOD OF MOVING HEAVY MATERIALS

BACKGROUND OF THE INVENTION

This invention relates to a method of moving heavy building materials, and particularly a method of hanging and moving ALC blocks used to construct a wall structure of a building.

ALC blocks (aerated concrete blocks) are used as building materials for constructing a wall structure.

Such an ALC block is too heavy for a single person to handle. Moving such ALC blocks is an extremely hard job for workers. If a worker's hands slip and he drops a block, he may be seriously injured.

At a construction site, ALC blocks are unloaded from a truck and laid. The work conditions are thus extremely harsh.

If ALC blocks can be hung and moved by e.g. a crane, it is possible to save much labor. In order to hang ALC blocks with a crane, anchors have to be fixed to ALC blocks and hanging tools have to be connected to such anchors.

While such anchored ALC blocks are already known, they are difficult to manufacture and thus costly because the anchors are planted in the blocks when the ALC blocks are manufactured at a factory.

SUMMARY OF THE INVENTION

An object of this invention is to provide a method of fixing anchors to an ALC block at a construction site so that the ALC block can be hung and moved by e.g. a crane.

According to this invention, there is provided a method for hanging and moving a building material comprising the steps of forming holes in the top surface of the building material, forming starting holes in the bottoms of the respective holes, forming anchors each comprising three metallic plates superposed one on another and having a first and a second end, the metallic plates being joined together at the first end, each of the anchors having a hole at the first end, driving the anchors into the respective starting holes and into the building material with the second end first while spreading apart the outer metallic plates so that the anchors will not be easily pulled out, engaging hanger members in the holes formed in the anchors, and hanging and moving the building material.

Each anchor comprises three metal plates substantially equal in length and width and superposed one on another. They are fixed together at one end by e.g. spot welding. At the other end, the outer metal plates 5 and 6 have tapered surfaces inclined toward the central metal plate. The tapered surfaces help the outer plates to spread apart. Thus, when the anchors are driven into the ALC block, the outer metal plates spread apart, so that the anchors are strongly fixed in the ALC so as not to be easily pulled out.

BRIEF DESCRIPTION OF THE DRAWINGS

Other features and objects of the present invention will become apparent from the following description made with reference to the accompanying drawings, in which.

DETAILED DESCRIPTION OF THE INVENTION

An embodiment of this invention is now described with reference to the drawings.

Figure 1:
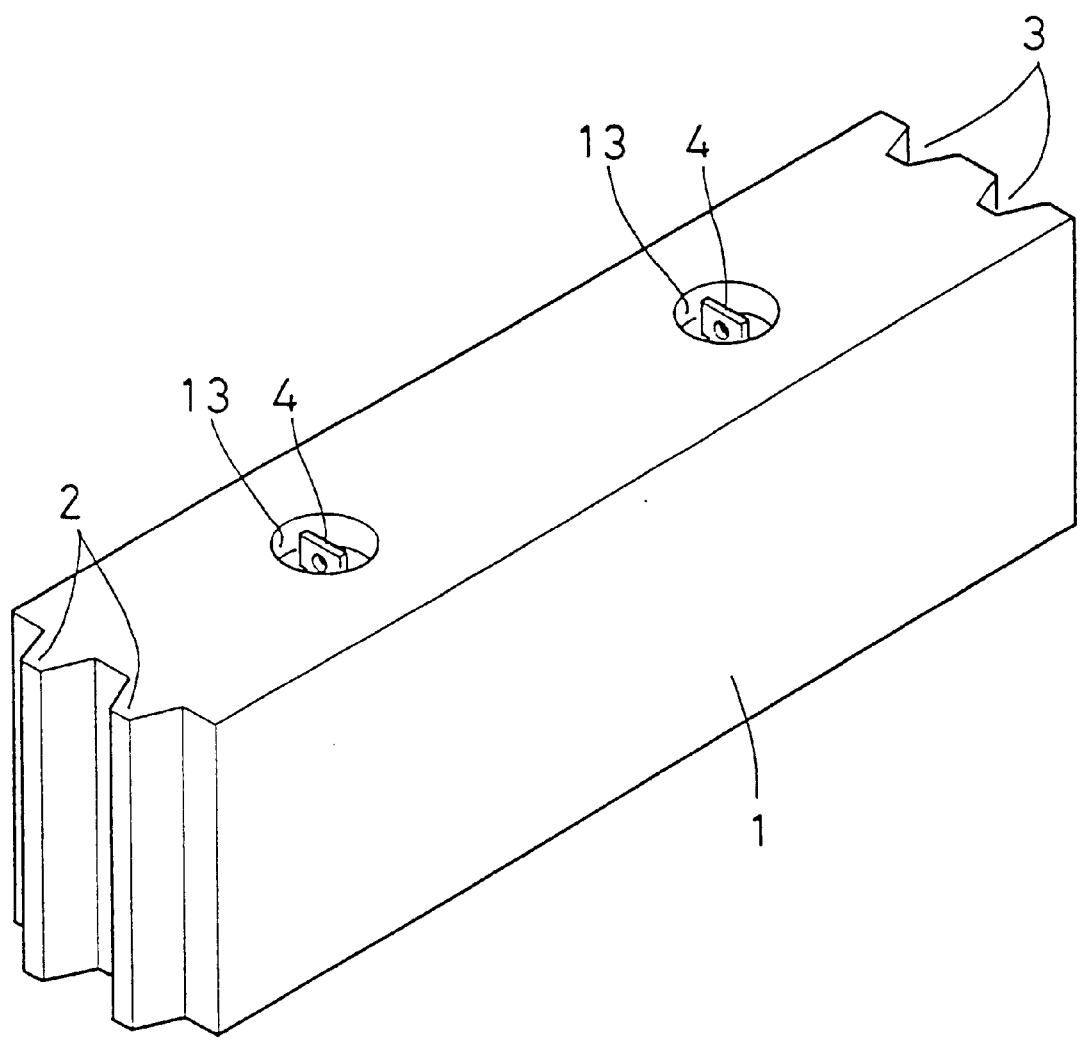
FIG. 1 is a perspective view of an ALC block to which are fixed anchors by the method according to this invention.

FIG. 1 shows an ALC block 1 used to erect e.g. a wall structure of a building. Each block has ribs 2 at one end which can fit in grooves 3 formed in another block at the other end. There are also other blocks having flat ends with no ribs or grooves. Blocks of this type are heavy objects having a flat top surface with no hanging anchors embedded when manufactured at a factory.

Figure 2:
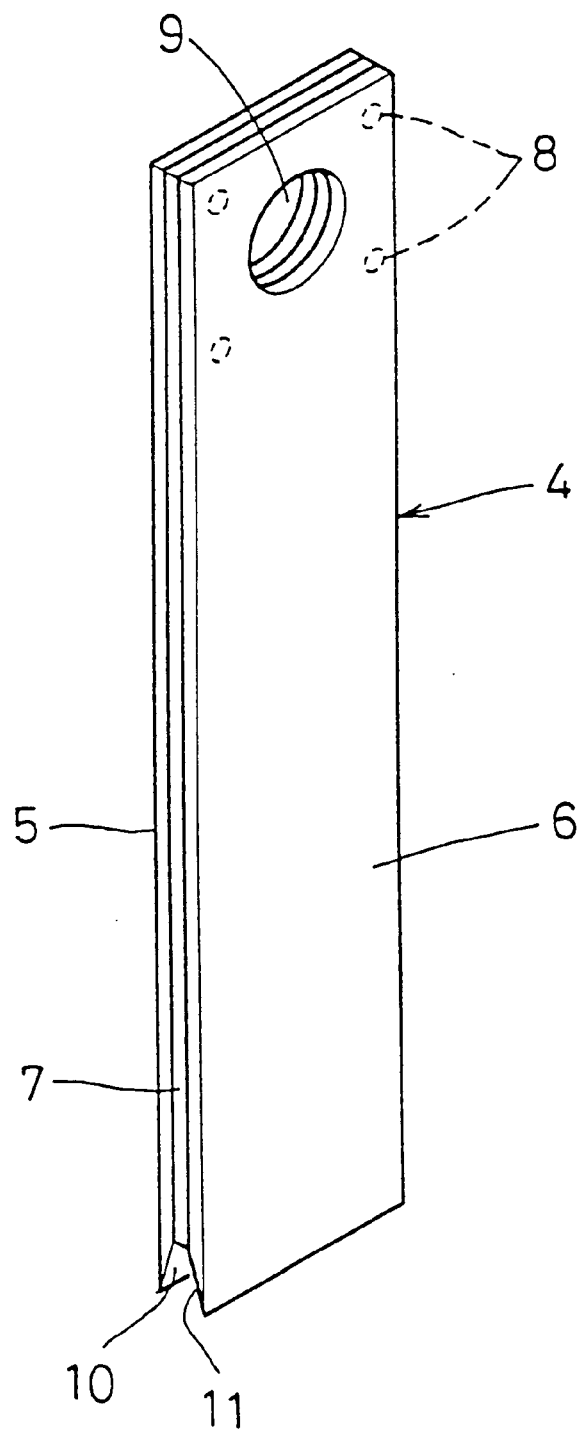
FIG. 2 is a perspective view of an anchor used in this invention.

FIG. 2 shows an anchor 4 for hanging and moving an ALC block 1 at a construction site. The anchor 4 comprises three metal plates 5, 6 and 7 substantially equal in length and width and superposed one on another so that their ends and side edges will align. They are fixed together at one end by e.g. spot welding 8 and are formed with a hole 9 at said one end. At the other end, the outer metal plates 5 and 6 have tapered surfaces 10, 11 inclined toward the central metal plate 7. The tapered surfaces 10, 11 help the plates 5, 6 to spread apart.

Figure 5A:
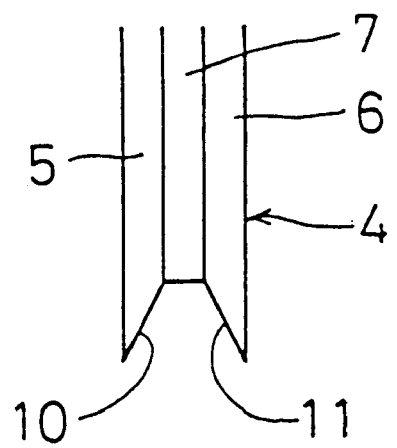
FIGS. 5A and 5B are front views of different anchor tips.
Figure 5B:
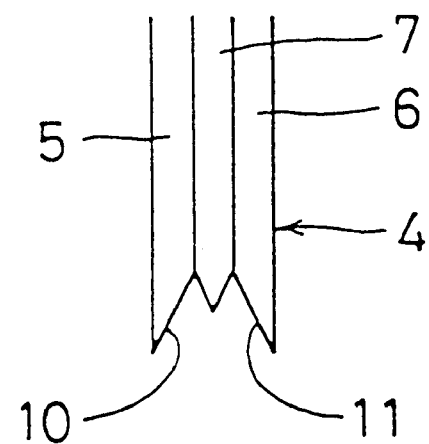

The other end of the central metal plate 7 is located slightly inwardly of the ends of the outer metal plates 5 and 6, and may be flat as shown in FIGS. 2 and 5A or pointed as shown in FIG. 5B.

Figure 3A:
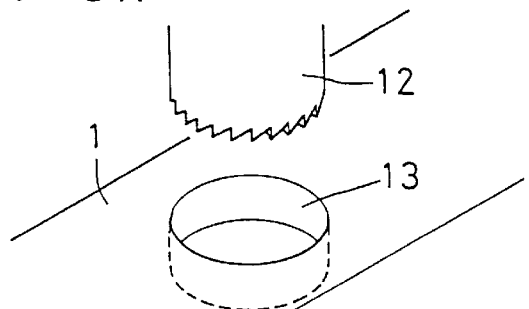
FIGS. 3A to 3E are perspective views showing, step by step, the method according to this invention.
Figure 3B:
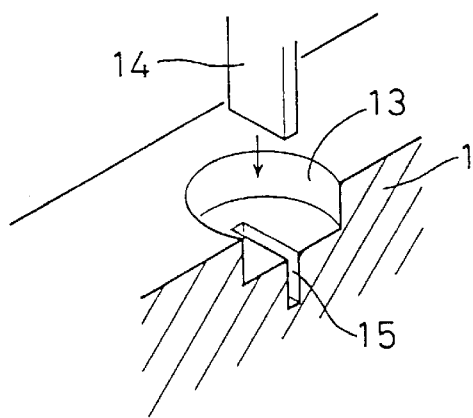
Figure 3C:
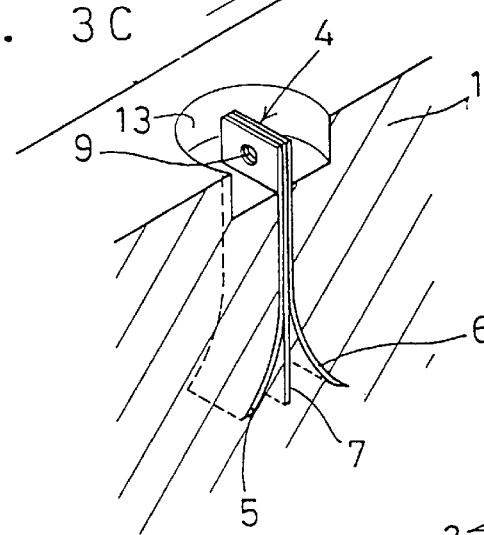
Figure 3D:
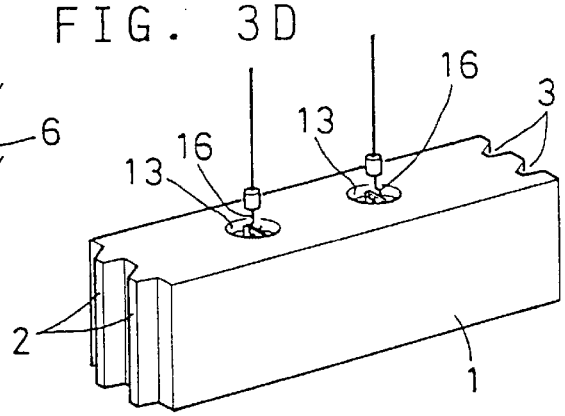
Figure 3E:
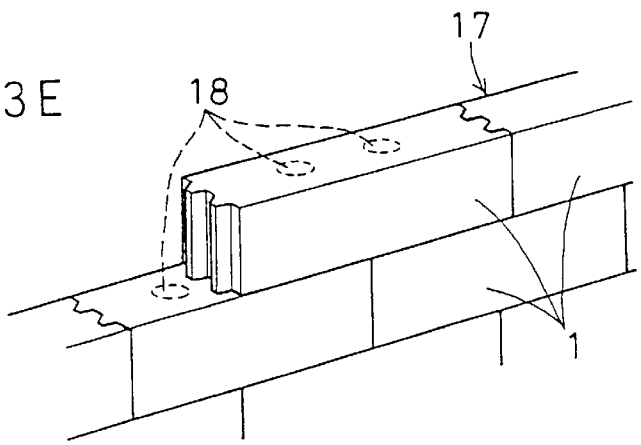
Figure 4:
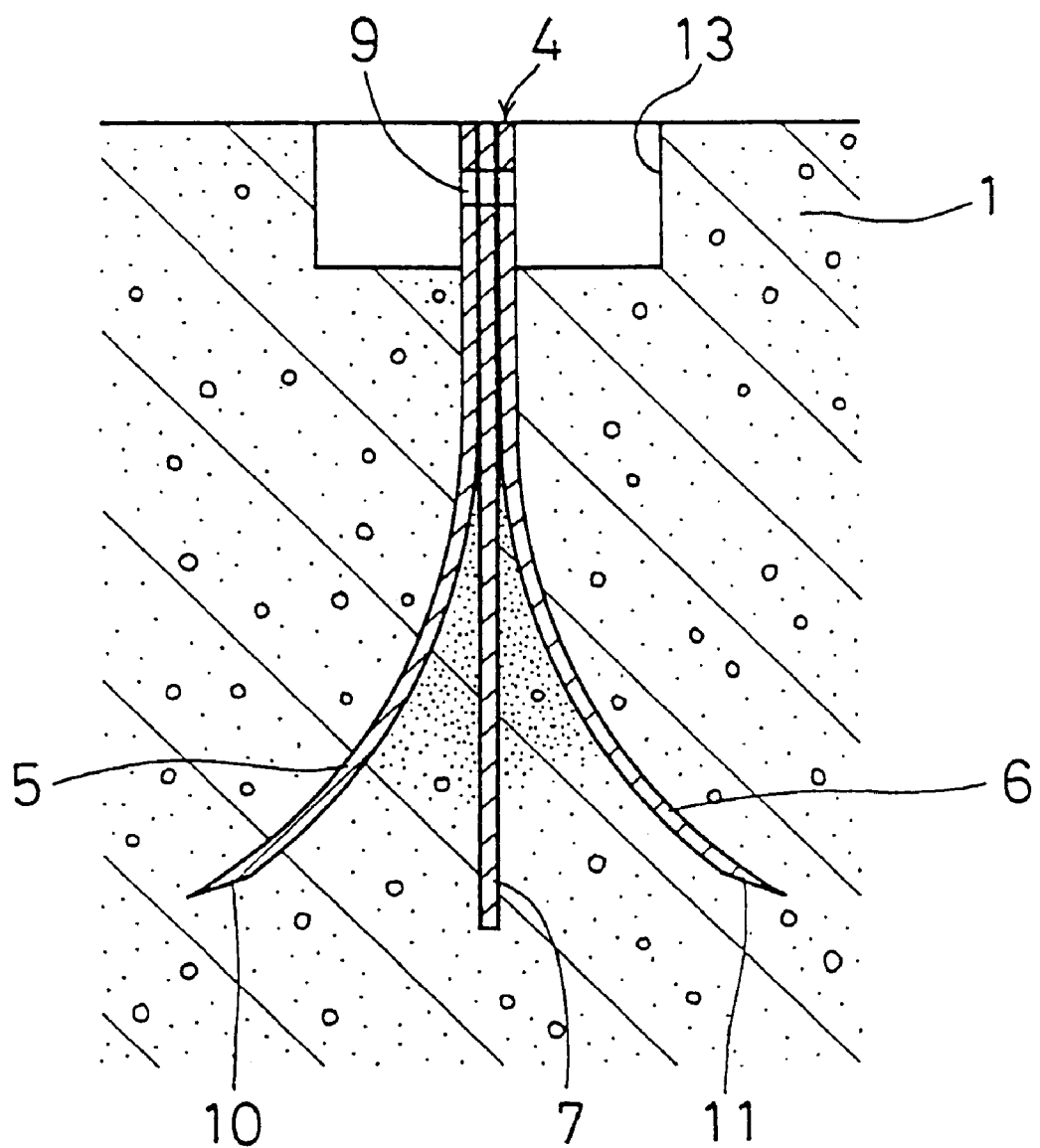
FIG. 4 is an enlarged sectional view of an anchor with its outer plates spread apart in ALC.

FIGS. 3 and 4 show how anchors 4 are used to move an ALC block 1.

First, as shown in FIG. 3A, holes 13 are formed in the top surface of the ALC block 1 near both ends thereof by e.g. a power drill 12. Then, as shown in FIG. 3B, a thin rectangular plate 14 is driven into the bottom of each hole 13 and then pulled out to form a starting hole 15 deep enough for the tip of the anchor 4 to be inserted.

With its tip inserted in the respective starting hole 15, each anchor 4 is driven into the block by striking its head or top end until the head becomes flush with the top surface of the ALC block 1. In this state, the hole 9 of each anchor 4 is in the hole 13.

When each anchor 4 is being driven into the ALC block 1, the central metal plate 7 proceeds in a straight line, while the outer metal plates 5, 6 spread apart from each other while bending arcuately outwardly, guided by the tapered surfaces 10, 11.

As the outer metal plates 5, 6 spread apart as shown in FIG. 4, ALC (aerated concrete) is trapped therebetween, and the trapped ALC is compressed by the central metal plate 7, so that its density increases, thus dramatically increasing the resistance to the force that tends to pull out the anchor 4. This prevents the anchors 4 from being pulled out of the ALC block even if the block is a heavy one. Workers' safety is thus ensured.

With the anchors 4 fixed to the ALC block 1, hackers 16 are engaged in the holes 9 of the respective anchors 4 as shown in FIG. 3D, and the ALC block 1 is hung and moved by a crane or a hoist. ALC blocks are laid one on another in this way to construct a wall structure as shown in FIG. 3E.

When each ALC block 1 is laid, the hackers 16 are disengaged and the holes 13 are filled with a filler 18 such as putty.

Simply by forming holes 13 and starting holes 15 in an ALC block 1 and driving the anchors 4 into the holes 15, the block can be easily hung and moved even if the block is a heavy one. It is thus possible to save manpower and improve workers' safety.

It is thus possible to lay blocks more efficiently and easily than when blocks are laid manually. Blocks can be easily hung and moved. Thus, blocks can be laid at a low cost.

What is claimed is:

1. A method for hanging and moving a building material, said method comprising forming holes in the top surface of said building material, forming starting holes in the bottoms of said respective holes, forming anchors each comprising three metallic plates superposed one on another and having a first and a second end, said metallic plates being joined together at said first end, each of said anchors having a hole at said first end, driving said anchors into said respective starting holes formed in said building material with the second end first while spreading apart the outer metallic plates so that the anchors will not be easily pulled out, engaging hanger members in said holes formed in said anchors, and hanging and moving said building material.

2. A method according to claim 1, wherein in forming said anchors, the outer metallic plates are provided at their respective second ends with tapered portions.

3. A method according to claim 2, wherein said tapered portions are tapered from said second ends of said outer metallic plates inwardly and toward said first ends, respectively.

4. A method according to claim 3, wherein in forming said anchors, a center metallic plate is provided between said outer metallic plates, and said center metallic plate is provided at its second end with a flat end portion.

5. A method according to claim 3, wherein in forming said anchors, a center metallic plate is provided between said outer metallic plates, and said center metallic plate is provided at its second end with a pointed end portion.

6. A method according to claim 2, wherein in forming said anchors, a center metallic plate is provided between said outer metallic plates, and said center metallic plate is provided at its second end with a flat end portion.

7. A method according to claim 2, wherein in forming said anchors, a center metallic plate is provided between said outer metallic plates, and said center metallic plate is provided at its second end with a pointed end portion.

8. A method according to claim 1, wherein in forming said anchors, a center metallic plate is provided between said outer metallic plates, and said center metallic plate is provided at its second end with a flat end portion.

9. A method according to claim 1, wherein in forming said anchors, a center metallic plate is provided between said outer metallic plates, and said center metallic plate is provided at its second end with a pointed end portion.

* * * * *